J. B. STORMS.
FARM GATE.
APPLICATION FILED APR. 19, 1911.
1,008,678.
Patented Nov. 14, 1911.
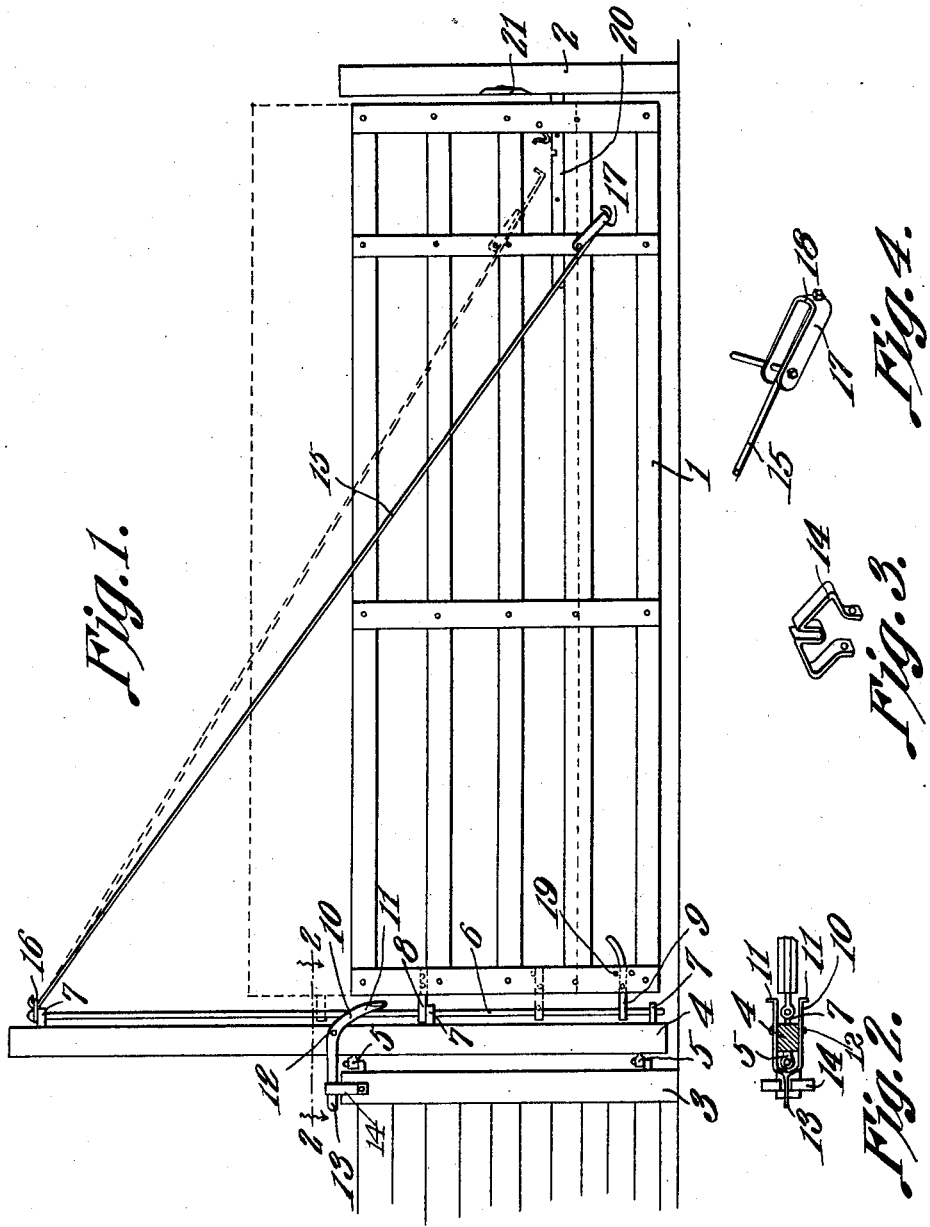
Witnesses
Jesse B. Storms,
Inventor
by C. A. Snow & Co.
Attorneys

UNITED STATES PATENT OFFICE.

JESSE B. STORMS, OF ALBION, NEW YORK.

FARM-GATE.

1,008,678.  Specification of Letters Patent.  Patented Nov. 14, 1911.

Application filed April 19, 1911. Serial No. 622,045.

*To all whom it may concern:*

Be it known that I, JESSE B. STORMS, a citizen of the United States, residing at Albion, in the county of Orleans and State of New York, have invented a new and useful Farm-Gate, of which the following is a specification.

My invention relates to improvements in gates, more especially for farm purposes.

The invention has for its object to provide for the ready adjustment of the gate to accommodate it to certain conditions as in clearing obstructions or to allow small animals to pass thereunder.

A further object is to effect the suitable locking or retention of the gate in elevated position when so adjusted.

A still further object is to guard against the liability of the breaking of the hinges by undue binding action of the parts one upon the other, in opening the gate.

A still further object is to provide for the automatic locking of the flexible or yielding members or connections of the gate as also for the automatic unlocking or releasing of the same.

A still further object is to carry out these ends in a simple, inexpensive and effective manner.

The invention consists of certain instrumentalities and features substantially as hereinafter fully disclosed and defined by the claims.

In the accompanying drawing illustrating the preferred embodiment of my invention, wherein it will be understood that various changes and modifications as relates to the details of the construction and arrangement of the parts may be made without departing from the spirit of my invention: Figure 1 is a side elevation of the invention, with the parts shown also in dotted lines in adjusted position. Fig. 2 is a horizontal section produced on the line 2—2 of Fig. 1, viewing downwardly in the direction of the arrows. Fig. 3 is detached perspective of a keeper adapted to receive or effect engagement with a cranked lever for the retention in effective position of the hinged-end of the gate as will be more fully appreciated later. Fig. 4 is also a detached perspective of one of the truss-rod clips with a broken portion of one of the truss-rods in position therein.

In practicing my invention, I suitably construct the gate 1 to provide for its support in position between a latch post 2 and a hinge-post 3, the gate in itself, however, being preferably of the ordinary farm-type construction.

An upright board-like member 4, intermediate of the rear end of the gate and the hinge-post 3 has hinge-connections 5 of the usual character upon one of its longitudinal edges, with said post; and suitably connected to said board-member upon its opposite longitudinal edge, is a rod 6, the connection therebetween being effected, at the center and at the upper and lower ends, by means preferably of bolts 7, the rod and board member thus having a flexible or hinge-connection with the hinge-post.

Between the gate 1 and the rod 6 is formed a slidable connection for the vertical adjustment of the gate by means of an eye-ended bolt 8, near the upper end and an eye-ended lever 9 near the lower end, the eye-ended portions of said bolt and lever receiving said rod and said lever being pivoted to the rear end of the gate, and whereby is also formed in addition a hinge-connection between the gate and said rod for the suitable opening and closing or swinging movement of the gate, further reference being made to said lever-member hereinafter.

A cranked bifurcated lever 10 has its arms or branches 11, which depend alongside of the hingedly connected member or board 4, suitably pivoted to the latter intermediate the ends of said branches, as at 12, the upper or horizontal arm 13 of said lever being received between the upbent portions of a keeper 14 preferably formed as shown and secured to the upper end of the hinge post, said lever or contrivance effecting the holding of the hingedly connected member 4 against yielding or flexing when the gate is in closed position. It will be noted that, however, when the gate is opened and it has subsequently reached a nearly wide-open position, the lower laterally extending portions of the branches 11 of the lever 10 will be engaged by the rear edge or end of the gate, which, it is apparent, will result in depressing the engaged branched lower ends of said lever. This will, accordingly, elevate the arm 13 of the lever 10 out of engagement with the keeper 14 which will of course allow the board member 4 to pivot or turn upon its hinges and thus being allowed to partake of the movement of the gate, it will swing cleararound at right angles to the hinging side of the hinge-post 3, also allowing the gate to assume a corresponding position. This movement of parts will allow the gate to swing clear back into its full open position without any liability of the cramping or undue binding of the hinge-connections, as would otherwise be the case.

Suitable truss-rods 15 for the requisite bracing and balancing of the gate, connect at their upper ends with a plate 16 fixed to the upper end of the rod 6, said plate being suitably provided with openings for that purpose, the forward or lower ends of said truss rods extending slidably through, and supported in the transverse portions of clips 17 pivotally connected to, and arranged upon the gate, for effecting the required connection between the truss-rods and the gate. The ends of the truss-rods, extending through said clips are suitably headed or otherwise adapted as at 18 to prevent their casual separation, the clips moving with and conforming to the changed position of the truss-rods of the gate when the latter is vertically adjusted, all as indicated in Fig. 1 by dotted lines. It will be further noted that, when it may be desired to vertically adjust or raise the gate for any purpose, as for instance, to clear an obstruction, as snow, etc., or to allow the passage thereunder of small animals, it is only necessary to suitably raise the gate, which may be readily done by engaging it bodily, and that by suitably manipulating the lever 9 so as to effect a binding action therebetween and the rod 6 for the temporary retention of the lever in such engagement with the latter. Also it will be observed that, by the use of a pin or plug 19, suitably shiftable from a position above the lever 9 to the underside thereof, the lever may be locked against casual movement to prevent the raising of the gate by an attempt of the small animals to leave the inclosure when this may not be desired.

It will be understood that the truss-rods have a suitable flexing connection with the clip 17 and the plate 16 to accommodate the movement of the gate as above indicated in effecting the adjustment of the latter.

A suitable preferably notched latch-bar 20 is supplied to the gate, with which engages a retaining catch or keeper 21 suitably seated in the gate post 2 and adapted to engage said latch-bar, for fastening the gate.

It is believed that from the foregoing description, the operation of my invention is apparent, and that its advantages and benefits will be fully appreciated while the construction of the device is exceedingly simple and may be put up at the minimum expense, and readily incorporated into the gates now in general use.

I claim:

1. A gate comprising a hingedly connected member intermediate the gate and hinge-post, and means for the retention of said hingedly connected member from casual movement including a bifurcated angular lever hung upon said hingedly connected member and a keeper for said lever arranged upon the hinge-post.

2. A gate of the type described, comprising a hingedly connected member intermediate said gate and the hinge-post, a bifurcated angular lever fulcrumed upon said hingedly connected member, and a keeper arranged upon the hinge-post and adapted to receive one arm of said lever.

In testimony that I claim the foregoing as my own, I have hereto affixed my signature in the presence of two witnesses.

JESSE B. STORMS.

Witnesses:
 JAMES T. FITZPATRICK,
 GEORGE TOWNSEND.

---

Copies of this patent may be obtained for five cents each, by addressing the "Commissioner of Patents Washington, D. C."